United States Patent Office 3,300,516
Patented Jan. 24, 1967

3,300,516
OXIDATION OF AN AROMATIC COMPOUND
Theodore Vrbaški, Harvey, Ill., assignor to Sinclair Research, Inc., New York, N.Y., a corporation of Delaware
No Drawing. Filed Apr. 3, 1963, Ser. No. 270,158
5 Claims. (Cl. 260—346.4)

This invention relates to the oxidation of aromatic compounds and more particularly is concerned with an improved catalyst system for the vapor phase, oxygen-containing gas oxidation of aromatic compounds, especially ortho-di(lower alkyl) benzenes to corresponding anhydrides.

Many processes are well known whereby aromatic compounds may be oxidized to commercially valuable products by vapor phase reaction with an oxygen-containing gas, e.g. air, in the presence of metal oxide catalysts. Typical of such processes are the oxidation of benzene to maleic anhydride and the oxidation of ortho-xylene or naphthalene to phthalic anhydride. In commercial vapor phase oxidation processes a mixture of an oxygen-containing gas such as air, together with the vapors of the aromatic feedstock are reacted at elevated temperatures in the presence of an oxidation catalyst which is usually a vanadium oxide and which may be supported on an inert carrier. Depending upon the nature of the aromatic feedstock, the catalyst employed, and the product desired, reaction conditions are selected within a temperature range of about 250 to 600° C., catalyst contact times of between about 0.01 to 5 seconds, pressures from about 1 to 10 atmospheres absolute, and molar ratios of oxygen to aromatic hydrocarbon between about 10:1 and 90:1, preferably about 15:1 to 60:1.

However in catalytic vapor phase oxidations, it has been found that notwithstanding the use of an active catalyst it is necessary to exercise the most rigid control over reaction conditions, particularly the catalyst temperature and contact time, in order to obtain oxidation of the aromatic feedstock to the desired product without over-oxidation ultimately to carbon dioxides and water or without the production of less desirable by-products. Furthermore, the adaptation of catalytic techniques to the vapor phase oxidation of aromatics presents a number of problems, foremost of which is the problem of catalyst abrasion, and in conjunction therewith, the problem of obtaining an abrasion-resistant catalyst of suitable activity to produce selectively the desired product. The present invention has as one of its objects the provision of a vanadium pentoxide-containing catalyst possessing a high degree of abrasion resistance when used for the vapor phase oxidation of aromatics, for example, of ortho-xylene or naphthalene to phthalic anhydride.

Yet another problem of great concern in a vapor phase oxidation is selectively producing the desired anhydride while blocking the production of undesired by-products such as phthalide or ortho-tolualdehyde and preventing the formation of excessive amounts of carbon oxides. Heretofore, it has been necessary, for instance, to provide elaborate and expensive reactor vessel designs to effect and maintain stringent control over process variables so that yields from a commercial vapor phase operation would even approach a satisfactory level. Notwithstanding the meticulous care taken, yields often were considered short of being adequate.

In vapor phase oxidations, the obvious benefits in employing a more selective catalyst system to attain a higher product yield with lower loss to undesired by-products such as phthalide or ortho-tolualdehyde and to carbon oxides give, in addition, marked advantages from the standpoint of controlling oxidations in commercial plants. For instance, the observed heat which is liberated in this oxidation process is always much greater than the calculated heat of reaction. For instance, the heat of oxidation of ortho-xylene amounts to 308.3 kcal./mole as compared with 448.9 kcal./mole for naphthalene. In the oxidation of the former no carbon oxides are formed and no rupture of ring takes place. The heat of oxidation of benzene to maleic anhydride amounts to 448.9 kcal./mole. However, in practice due to over-oxidation the total heat liberated is about the same in each case and amounts to about 700 kcal./mole. The large heat of reaction necessitates the employment of elaborate heat-dissipating equipment to avoid the formation of hotspots in the catalyst bed and to prevent burning of the feedstock or product to undesirable by-products such as carbon oxides. To remove heat of reaction and prevent the formation of catalyst hotspots which usually result in sintering the catalyst surface, it is the practice either to employ a fluidized catalyst bed or to place the catalyst in thin-walled, small diameter, metal tubes surrounded by boiling or molten heat-exchange media. By providing a more selective catalyst system, the extent of oxidation of, for instance, ortho-xylene to undesirable by-products such as maleic anhydride and carbon oxides is minimized. This results in a lowering of the actual heat liberated and reduces, at least to some extent, the problem of temperature control of the catalyst bed. Consequently, as an added advantage, existing plant feed rates may be increased since the burden heretofore imposed on heat removal equipment would be substantially reduced.

Accordingly, it is an object of the present invention to improve the yields of processes for the vapor phase oxidation of aromatic compounds to commercially valuable products by improving the selectivity of the catalyst system and, accordingly, reduce the amount and nature of by-products formed in the process. Yet another object is to facilitate the practice of commercial oxidations by reducing the practical heat of reaction in order to avoid the formation of hotspots in the catalyst bed which result in the sintering of the catalyst and concomitant reduction of catalyst activity and selectivity.

The objects of this invention may be attained in a convenient manner by conducting vapor phase, molecular oxygen-containing gas, e.g. air, oxidation of aromatic hydrocarbons in the presence of a vanadium pentoxide catalyst provided with promotional amounts of one or more oxides of Group Vb metals which have atomic numbers in the range of 41–73, that is, columbium and/or tantalum. Advantageously, the promoted metal oxide catalyst is supported on an inret carrier such as alpha-alumina, pumice, etc. and in this case the novel catalyst often contains about 5 to 50, preferably 10 to 40, weight percent of catalytically active metal oxides based on the total weight of the supported catalyst. Usually in the catalyst, whether supported or unsupported, the promotional Group Vb metal is present in amounts of about 0.01 to 25 weight percent, preferably 1 to 10 weight percent, said metal component being calculated as its oxide, based on the total weight of the catalytically active metal oxides. On a support free basis, vanadium is present in amounts of about 75 to about 99.9 weight percent, the balance being essentially a promotional Group Vb metal. In the supported catalyst the catalytic metal components are usually partially fused, i.e. fused sufficiently to obtain a catalyst having a low surface area, for instance, of less than one square meter per gram. Generally, the supported catalyst experiences a 20 to 80 percent fusion, preferably about 40 to 60 percent, while the unsupported catalyst is often essentially completely fused.

In a particular embodiment of this invention the catalyst preferably may be prepared by fusing a blend of vanadium and columbium pentoxides at a temperature of about 750 to 1100° C. Although pure columbium pentoxide has a relatively high melting point, i.e. about 1520° C., compared to that of vanadium pentoxide, i.e. about 690° C., it has been found that blends of the two oxides containing as high as 20 weight percent columbium pentoxide which may be obtained commercially or by, for instance, the air oxidation of columbium oxalate at about 500° C. for a period of about 4 hours, can readily be fused at temperatures well below 1100° C., probably due to the formation of eutectic mixtures. When the blend is cooled, the melt solidifies into a homogeneous reaction mass characterized by the presence of a mixture of crystalline and glass-like surface. Subsequently the mass is crushed to produce a catalyst, for instance, in the mesh size range of about 8 to 10. Alternatively tantalum oxide may be employed rather than columbium pentoxide or a fused blend of vanadium, tantalum and columbium oxides has also been found to be effective.

To provide the catalyst having a low surface area, the vanadium pentoxide and promoters are preferably deposited on an inert low surface carrier although the vanadium oxide, itself, can serve as the support as well, if desired. As noted above, alpha-alumina is the preferred inert low surface area carrier although other useful supports includes zeolites, asbestos, pumice, quartz, corundum, kieselguhr and silica gel.

Where the catalyst is to be deposited on an inert carrier, the metal oxides may be provided by any of the common manufacturing methods. Included among these methods are thermal decomposition of a volatile metal compound; impregnation of the carrier with molten catalytic metal oxides; precipitation from a colloidal suspension of the catalyst metal oxides in an inert liquid; or preferably, impregnation of the carrier with a slurry or solution containing a catalyst salt. For instance an inert carrier such as corundum may be impregnated with an aqueous solution of vanadyl sulfate and columbium oxalate in amounts such that the catalyst contains preferably 10 to 40 weight percent catalytically active material. Subsequent to such impregnation procedures the catalyst is generally dried and heat-treated at a temperature between about 700° C. and 1100° C. for a period of about 2 to 8 hours or longer, preferably about 4 hours. Catalysts so prepared are characterized by a uniform coating of the active material on the carrier surface and they exhibit satisfactory abrasion-resistant properties.

Preferably in fixed bed vapor phase processes the carrier is generally in the form of discrete particles, preferably of from about 3 to 10 mesh size, in the shape of pills, pellets, cylinders, beads, extrudates, granules, or the like. In fluidized-bed reactors the catalyst carrier is generally finely divided powder or microspheres, having particle sizes between about 10 and 100 microns.

The ortho-(di-lower alkyl)benzenes suitable for oxidation to their corresponding anhydrides according to this invention contain at least one set of ortho-oriented lower alkyl radicals such as a non-tertiary alkyl radical having about 1 to 4 carbon atoms, for instance, methyl, ethyl, propyl, isopropyl, n-butyl, and other oxidizable alkyl radicals. These di-lower alkyl benzenes may also, advantageously, contain more than one set of ortho groups such as are found, for instance, in durene and each set may be oxidized to the anhydride form. The ortho groups on the benzene nucleus, may conveniently form a carbocyclic ring with the nucleus as in the case of naphthalene and lower alkyl naphthalenes. Representative compounds suitably employed in the instant invention having one set of ortho-oriented groups as ortho-xylene, ortho-ethyltoluene, ortho-ethylcumene and ortho-diisopropylbenzene which may be oxidized to phthalic anhydride. Representative compounds having more than one set of ortho-oriented alkyl groups are durene (1,2,4,5-tetramethyl benzene) which may be converted to pyromellitic dianhydride and prehnitene (1,2,3,4-tetramethyl benzene) which may be oxidized to mellophanic dianhydride. Compounds which are also suitably employd in the instant invention are represented by, for instance, naphthalene, methylnaphthalene and 2,3-dimethylnaphthalene which are oxidized to phthalic anhydride. Anthracene which forms anthroquinone and/or phthalic anhydride as well as phenanthrene which on oxidation produces a mixture of phenanthraquinone, diphenic acid anhydride and phthalic anhydride may also be used. Aromatic alicyclic ring compounds such as indene, indane, 1,4-dihydronaphthalene and tetralin all of which have five or six-membered alicyclic rings connected to adjacent carbon atoms on an aromatic ring, may be used and are generally converted to phthalic anhydride.

The operating conditions which give favorable yields for the vapor-phase oxidation of the aromatic feedstock may vary widely. For instance, the oxygen-containing gas employed in the process is desirably air, for reasons of economy, but other gases, such as pure oxygen or air enriched with oxygen may be used. When air is used, it is preferably to employ it in molar ratios of oxygen to aromatic hydrocarbon between about 10:1 and 90:1, preferably about 15:1 to 60:1. It is also advantageous to preheat the air within a few degrees of the reaction temperature which is preferably between 400° C. and 500° C., although reaction temperatures as low as 300° C. and as high as 600° C. may be used. The oxidation is generally and preferably conducted at atmospheric pressure although superatmospheric pressures may be employed if desired. The volume hourly space velocity may vary from about 900 to 20,000 hr.$^{-1}$ while the weight hourly space velocity may range between about 0.01 to 0.25 hr.$^{-1}$.

Recovery of the oxidation product may be effected by any one or more of numerous different procedures. For instance, phthalic anhydride is conveniently crystallized as colorless rhombic needles by cooling the reactor effluent gases. The effluent gases may also be scrubbed with aromatics such as benzene, xylenes, diphenyl or methylnaphthalene. Scrubbing may be conducted in either a spray towel, in a packed column or in other equipment.

To more clearly understand the features of this invention typical vapor phase catalytic oxidations of aromatic compounds are described hereinafter.

*Example I*

For the oxidation of ortho-xylene in a fixed bed reactor, the necessary equipment may be grouped into three zones. In the first, or reactant make-up zone, the proportions of air to ortho-xylene are established. The second or reactor zone comprises the physical reactor assembly with its auxiliaries for pre-heating the reactants and removing the heat reaction. In the third or product-recovery zone the reactor effluent is treated for the recovery of phthalic anhydride.

More specifically, in the make-up zone, primary air is introduced into the system at atmospheric pressure and led to a vaporizer. With the secondary air a 0.346 mole percent ortho-xylene in air mixture is formed. This gas mixture is fed to the second zone where prior to introduction into the oxidation reactor it is fed to a preheater and preheated to a suitable temperature, e.g. between about 400 and 500° C. The preheated ortho-xylene-air mixture is passed to the reactor at a volume hourly spaced velocity of 12,000 hr.$^{-1}$. The reactor, maintained at a temperature of about 450° C. is immersed in a constant temperature bath, which is preferably an electrically heated salt-bath containing for instance a mixture of potassium and sodium nitrate in a weight ratio of about 1:1. The salt bath is stirred by an agitator and its temperature may be controlled to ±0.5° C. by any suitable means, for instance, a Gardsman regulator. The reactor is packed with about 15 g. of a catalyst comprising an unsupported fused blend of vanadium and columbium pentoxides. The weight percent of vanadium and columbium in this catalyst amounted to about 99% and about 1%, respectively. The catalyst was in the form of pellets having a particle size of about 8 to 10 mesh. The products of oxidation leave the reactor and are passed to the third zone. The reactor effluent enters an air condenser after which it is passed to the first of two Dry Ice condensers wherein all the more volatile products are trapped out by cooling to a temperature of about −60° C. A 69.6 mole percent yield of phthalic anhydride was recovered. Also produced in the following mol percent yields were ortho-tolualdehyde, 1.0 percent; phthalide, 1.0 percent; formaldehyde, 10.1 percent and carbon oxides, 20.4 percent. The latter determinations may be carried out in a conventional Orsat apparatus. Alternatively the phthalic anhydride may be removed from the gases by suitable means such as by contacting them directly with a spray of water or with an aqueous slurry of phthalic acid or scrubbing them with aromatics such as benzene, xylenes, diphenyl, and methyl-naphthalene. The scrubbing may be conducted either in a spray tower, in a packed tower or in other equivalent equipment.

*Example II*

Example I is repeated, except that the feed mixture contains 0.337 mole percent ortho-xylene in the air and the catalyst employed was an unsupported fused catalyst consisting of vanadium and columbium pentoxides, in weight percent amounts of about 95% and about 5%, respectively. The results of this run are given below in Table I.

*Example III*

Example I was again repeated with essentially the same feed mixture composition except that the catalyst was an unsupported fused catalyst consisting of vanadium and columbium oxides in weight percent amounts of about 80% and about 20%, respectively. These results are also shown in Table I.

*Example IV*

The procedure of Example I is repeated again except that the feed mixture contains 0.441 mole percent ortho-xylene in air and the oxidation was conducted over a supported partially fused catalyst consisting of vanadium and columbium oxides which were present on a support-free basis in weight percent amounts of about 95% and about 5%, respectively. The mixed oxides comprised about 10 weight percent on the inert support which was SA203 Norton silica-alumina. The particle size of the catalyst ranged from about 8 to 10 mesh. The data for this example is also given in Table I below.

*Examples V and VI*

The procedure of Example I is again repeated using an unsupported fused catalyst consisting of vanadium and columbium pentoxides present in weight percent amounts of about 95% and about 5%, respectively. The feed mixture for Example V contains 0.458 mole percent ortho-xylene and Example VI contains 0.487 mole percent ortho-xylene. These results are also shown in Table I below.

*Example VII*

The procedure of Example I is repeated using a supported partially fused catalyst consisting of vanadium and tantalum oxides which were present, on a support-free basis in weight percent amounts of about 90% and about 10%, respectively. The mixed oxides comprised about 10 weight percent on the inert support which was SA203 Norton silica-alumina. The particle size of the catalyst ranged from about 8 to 10 mesh. The feed mixture contains 0.431 mole percent ortho-xylene in air. The data for this example is also given in Table I below.

*Example VIII*

For purposes of comparison, a fused, unsupported $V_2O_5$ catayslt was used employing the same oxidation procedures outlined in Example I with a feed mixture containing 0.458 mole percent ortho-xylene. These results are shown in Table I below.

*Example IX*

Again for purposes of comparison a commercial catalyst was used employing the same oxidation procedures outlined in Example I with a feed mixture containing 0.488 mole percent ortho-xylene. The results are shown in Table I below.

TABLE I

| Examples | 1 | 2 | 3 | 4 | 5 | 6 | 7 | 8 | 9 |
|---|---|---|---|---|---|---|---|---|---|
| Experimental Conditions: | | | | | | | | | |
| Catalytic Metals | V-Cb | V-Cb | V-Cb | V-Cb | V-Cb | V-Cb | V-Ta | V | [e] Catalyst |
| Temperature of bath in °C | 450 | 450 | 460 | 450 | 450 | 450 | 460 | 460 | 460 |
| Partial pressure of hydrocarbon in air in mole percent | .346 | .337 | .347 | .441 | .458 | .487 | .431 | .458 | .488 |
| Volume hourly space velocity [a] | 12,000 | 12,000 | 5,740 | 12,000 | 3,600 | 7,200 | 5,760 | 5,740 | 5,960 |
| Weight hourly space velocity [b] | .042 | .040 | .021 | .068 | .022 | .034 | .024 | .030 | .035 |
| Product distribution in mole percent: | | | | | | | | | |
| Phthalic anhydride [c] | 69.6 | 72.5 | 69.1 | 72.0 | 66.4 | 68.1 | 72.1 | 53.5 | 53.9 |
| Maleic anhydride | .3 | .2 | 2.6 | .2 | 3.7 | 3.6 | .1 | 7.3 | 6.4 |
| Ortho-tolualdehyde | 1.0 | 2.3 | 1.3 | 2.0 | None | .2 | 3.0 | 1.6 | 1.7 |
| Phthalide | 1.0 | .9 | .4 | .5 | None | .2 | .3 | 5.0 | 3.1 |
| Formaldehyde | 10.1 | 10.2 | N.D. | 6.8 | 9.6 | 10.1 | 4.0 | N.D. | N.D. |
| Carbon oxides | 20.4 | 19.6 | 23.7 | 21.2 | 22.4 | 21.6 | 21.5 | 23.3 | 21.7 |
| Unreacted ortho-xylene | None | None | .5 | None | None | None | None | .4 | .8 |
| Recovery | 102.4 | 105.7 | 97.6 | 102.7 | 102.1 | 103.8 | 101.0 | 91.1 | 87.5 |
| Selectivity [d] | 69.6 | 72.5 | 69.5 | 72.0 | 66.4 | 68.1 | 72.1 | 53.6 | 54.4 |

[a] With respect to total gas at reactor temperature.
[b] With respect to ortho-xylene.
[c] Conversion factor to lb. of phthalic anhydride per lb. of ortho-xylene=1.395.
[d] Selectivity is defined as moles of phthalic anhydride obtained per 100 moles of ortho-xylene reacted.
[e] Essentially vanadium pentoxide on alumina. Size is 8–10 mesh.

The above results show that with the catalyst of this invention a substantial increase in selectivity is evidenced by the substantial reduction in formation of undesired by-products.

It is claimed:
1. A process for the catalytic vapor phase oxidation of an ortho-(di-lower alkyl) benzene to the corresponding anhydride which comprises reacting said ortho-(di-lower alkyl) benzene in the vapor phase at a temperature from about 300 to 600° C. with molecular oxygen in the presence of a fused vanadium pentoxide oxidation catalyst, said cataylst being provided with a promotional amount of an oxide of a Group Vb metal having an atomic number in the range of 41 to 73.

2. The process of claim 1 wherein the promoting Group Vb metal oxide is present in amounts of about 0.01 to 25 weight percent, based on the total weight of the catalytically active metal oxides.

3. The process of claim 2 wherein the Group Vb metal oxide is columbium oxide.

4. The process of claim 2 wherein the metal oxides are supported on an inert carrier, said oxides being present in an amount of about 5 to 50 weight percent of the total catalyst.

5. The process of claim 4 wherein the vapor phase oxidation is the oxidation of ortho-xylene to phthalic anhydride.

References Cited by the Examiner
UNITED STATES PATENTS

| | | | |
|---|---|---|---|
| 2,698,306 | 12/1954 | Matejczyk | 252—464 |
| 2,930,802 | 4/1960 | Aries | 260—346.4 |
| 2,942,005 | 6/1960 | Brown et al. | 260—346.4 |
| 2,984,630 | 5/1961 | Braithwaite | 252—464 |

NICHOLAS S. RIZZO, *Primary Examiner.*

H. R. JILES, *Assistant Examiner.*